United States Patent [19]
Wentworth et al.

[11] 3,927,304
[45] Dec. 16, 1975

[54] FUEL CONTROL SYSTEMS

[75] Inventors: Philip Rossell Wentworth, Birmingham; Michael Murray Bertioli, Lichfield, both of England

[73] Assignee: The Lucas Electrical Company Ltd., Birmingham, England

[22] Filed: Feb. 19, 1974

[21] Appl. No.: 443,847

[30] Foreign Application Priority Data
Feb. 20, 1973 United Kingdom.................. 8214/73
Mar. 31, 1973 United Kingdom............... 15595/73

[52] U.S. Cl. ........................ 235/150.21; 123/32 EA
[51] Int. Cl.² ......................................... G06F 15/20
[58] Field of Search....... 235/150.2, 150.21, 151.34; 123/32 AE, 32 EA; 307/267

[56] References Cited
UNITED STATES PATENTS

| | | |
|---|---|---|
| 3,759,232 | 9/1973 | Wahl et al. ................. 123/32 AE X |
| 3,780,711 | 12/1973 | Lindberg ......................... 123/32 EA |
| 3,782,347 | 1/1974 | Schmidt et al. ................ 123/32 EA |
| 3,789,816 | 2/1974 | Taplin et al. ................ 123/32 EA X |
| 3,796,198 | 3/1974 | Mauch et al. .................. 123/32 EA |

OTHER PUBLICATIONS

J. G. Rivard, "Closed-Loop Electronic Fuel Injection Control of the Internal-Combustion Engine," Society of Automotive Engineers, International Automotive Engineering Congress, Jan. 8–12, 1973, pp. 1–9.

Primary Examiner—Malcolm A. Morrison
Assistant Examiner—Jerry Smith
Attorney, Agent, or Firm—Waters, Schwartz & Nissen

[57] ABSTRACT

An engine fuel control system including a pulse generator which produces pulses of length dependent on an engine parameter (e.g. air mass flow to the engine), an exhaust gas monitoring device and a device for adjusting the pulse length according to the output of the monitoring device.

6 Claims, 1 Drawing Figure

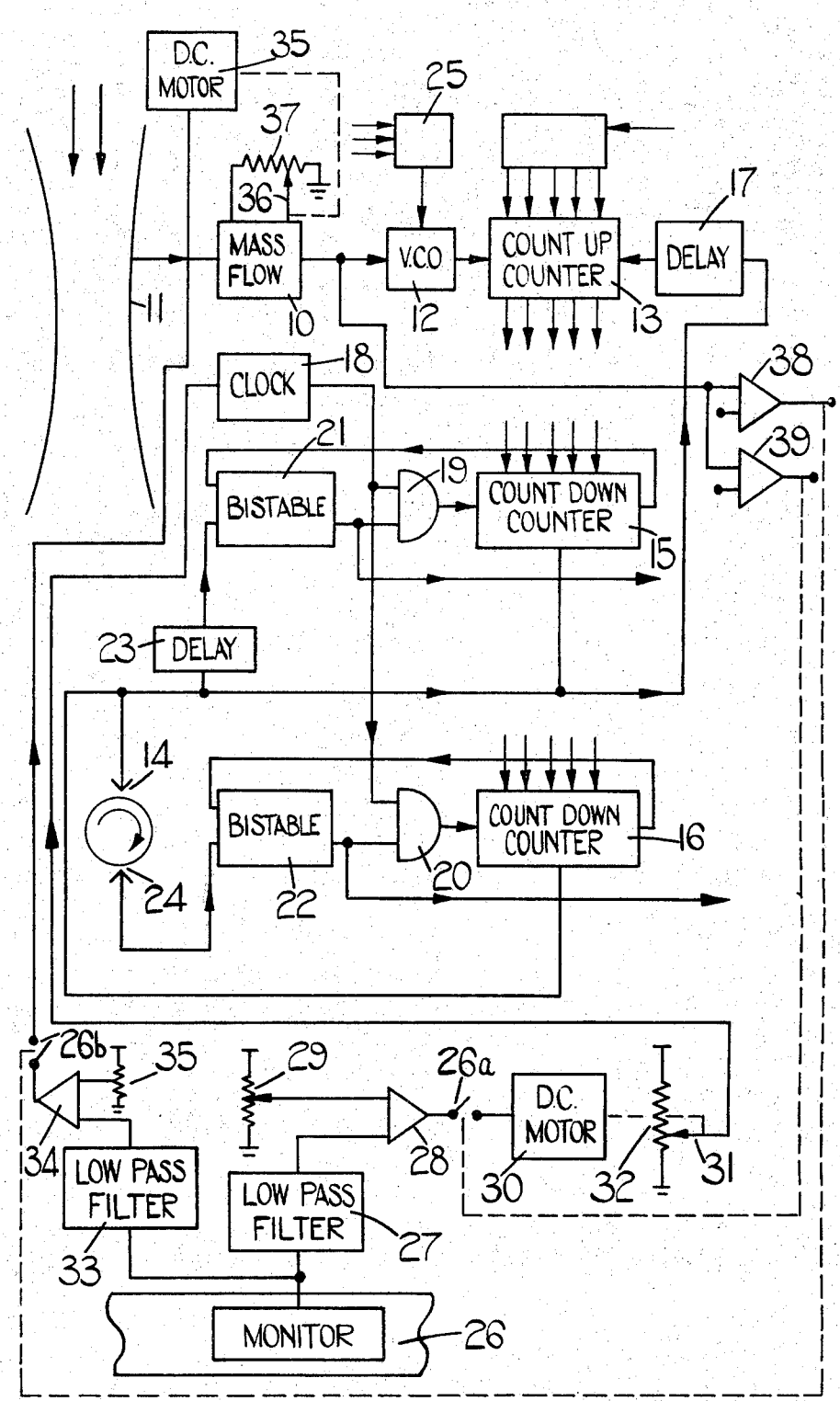

FUEL CONTROL SYSTEMS

This invention relates to fuel control systems for use in road vehicles and has as an object to provide such a system in a convenient form.

A fuel control system in accordance with the invention comprises means for producing an electrical output pulse, the length of which determines the quantity of fuel to be fed to the engine, in response to at least one engine parameter, means for monitoring the exhaust emission of the engine, means responsive to the monitoring means for deriving a signal representative of the nature of the exhaust emission, and means for adjusting the length of the electrical output pulse in accordance with the derived signal.

The invention also resides in a fuel control system as above defined wherein at least two independent means for adjusting the length of the electrical output pulse in accordance with the derived signal are provided, together with means for selectively operating one and/or the other of said at least two independent means.

The invention will now be more particularly described with reference to the accompanying drawing the sole FIGURE of which is a block circuit diagram illustrating one embodiment of a fuel control system constructed in accordance with the present invention.

Referring now to the drawing, there is shown therein an engine control system in the form of a fuel control system comprising a mass flow measuring device 10 which produces an electrical output directly proportional to the mass flow of air in the inlet manifold 11 of an internal combustion engine. The mass flow measuring device 10 includes an ion producer (not shown) which is mounted in the inlet manifold 11, and one or more electrodes (not shown) which are also mounted in the inlet manifold 11 opposite the ion producer so that the current measured at the electrode or electrodes will give the aforesaid output of the mass flow measuring device. The output of the mass flow measuring device 10 is used to control the output frequency of a voltage controlled oscillator 12. The output of the oscillator 12 is fed to a binary count-up counter 13 which counts the number of pulses produced by the voltage controlled oscillator 12 during one cycle of the internal combustion engine. Re-setting of the counter 13 after each complete engine cycle is achieved by a first additional contact breaker 14 which is mounted in the ignition distributor and which is arranged to be unaffected by auto-advance or vacuum advance action.

When the contact breaker 14 operates a count existing at that moment in the count-up counter is transferred to two digital memory units in the form of binary count-down counters 15 and 16, each of which is associated with one fuel injection unit of the engine. In the present case, said one injection unit comprises a group of injectors operable at the same time as each other, but in an alternative embodiment each fuel injection unit may comprise a single injector which is associated with only one cylinder of the engine.

The re-setting of the count-up counter 13 by the signal produced by the contact breaker 14 is delayed by a delay circuit 17 connected in circuit between the contact breaker 14 and the counter 13 for a short time period sufficient to enable the count in the count-up counter 13 to be transferred to the counters 15 and 16. In practice this delay is short compared with the time period of a cycle of the voltage controlled oscillator 12 and therefore no counts are lost by virtue of this delay. The count-down counters 15 and 16 can be counted down by a clock pulse generator 18 which is connected to the counters 15 and 16 through AND gates 19 and 20 respectively, and the frequency of which can be adjusted in a manner described hereinafter. The AND gates 19 and 20 each have two inputs one of each of which is connected to the clock pulse generator 18 and the other input of each AND gate 19, 20 is connected to the output of a bistable multi-vibrator 21, 22 respectively.

The bistable multi-vibrator 21 is set by a signal produced by the contact breaker 14. However, a delay circuit 23 is connected in series between the contact breaker 14 and the bistable multi-vibrator 21 to prevent setting of the multi-vibrator 21 until the count-up counter 13 has been re-set. The bistable multi-vibrator 21 is re-set by the counter 15 when the latter attains a zero value.

The bistable multi-vibrator 22 is set by a second additional contact breaker 24 which is also mounted in the ignition distributor associated with the internal combustion engine and which operates one half cycle after operation of the contact breaker 14. The bistable multi-vibrator 22 is re-set by an output from the counter 16 when the latter attains a zero value.

Since the injectors take a finite time to open and close, it is necessary to add a fixed time (assuming a constant operating voltage) to that determined by the mass flow measurement device 10 and the engine speed. This is achieved by resetting the count-up counter 13 to a finite number, rather than to zero, this number multiplied by the clock pulse period being added to the pulse width of the output signals from the bistable multi-vibrators 21 and 22 during operation of the fuel system. In order to compensate for battery voltage variation, it is only necessary to control the re-set number of the counter 13 from the battery voltage.

Cold start enrichment and variation in air fuel ratio required for correct operation at different engine temperatures during warm up, and fuel enrichment for maximum power at full throttle may be incorporated by variation of the output frequency of the voltage controlled oscillator by a control device indicated at 25.

The frequency of the clock pulse generator 18 may be altered in response to the nature of the exhaust emission of the engine so as to adjust the length of the pulses produced at the outputs of the bistable multi-vibrators 21 and 22, thereby ensuring that the fuel/air mixture fed to the engine is such that total or substantially total combustion of this mixture takes place. This may be achieved by continuously monitoring the exhaust emission while the engine is running by means of a monitor 26 which is mounted within a tube or chamber through which the exhaust emission passes and which may take the form, by way of example, of an oxygen sensor. The latter produces an electrical signal the amplitude of which is representative of the quantity of oxygen within the exhaust emission and this signal is fed to a low pass filter 27 which serves as an averaging circuit. The output of the low pass filter 27 is fed to one input of an error amplifier 28 the other input of which is fed with a reference voltage from a potentiometer 29, this reference voltage representing the optimum value of the signal produced at the output of the low pass filter 27 for a mass flow of air greater than a predetermined value. The output from the error amplifier 28 is fed through a switch 26a to a d.c. motor 30 which controls the position of a slider 31 of a potentiometer 32. Voltage applied to the slider 31 varies in accordance with the output of the error amplifier 28 and it in turn varies the frequency of the clock pulse generator 18.

The monitor 26 may take other forms, such as a carbon monoxide sensor.

The electrical signal produced by the monitor 26 is also fed to a further low pass filter 33 which also serves as an averaging circuit. The output of the low pass filter 33 is fed to one input of an error amplifier 34 the other input of which is fed with a reference voltage from a potentiometer 35, this reference voltage representing the optimum value of the signal produced at the output of the low pass filter 33 for a mass flow of air less than a predetermined value. The output from the error amplifier 34 is fed through a further switch 26b to a d.c. motor 35 which controls the position of a slider 36 of a potentiometer 37. The voltage applied to the slider 36 varies in accordance with the error amplifier 34 and it in turn varies the zero drift in the mass flow measuring device 10.

Means are also provided for selectively closing the switches 26a and/or 26b so that a signal representative of the output of the monitor 26 selectively adjusts the frequency of the clock pulse generator 18 and/or the zero drift of the mass flow measuring device 10. Such means comprises a pair of comparators 38 and 39 the first input of each of which is connected to the junction between the mass flow measuring device 10 and the voltage controlled oscillator 12. The other input of the comparator 38 is connected to a first reference voltage and a signal is produced at the output of the comparator 38 when the output of the mass flow measuring device 10 is less than the reference voltage applied to the other input of the comparator 38, such an output signal from the comparator 38 effecting closure of the switch 26b which may in fact be in the form of a semiconductor switching element such as a field effect transistor or which may be relay operated. The other input of the comparator 39 is connected to a further reference voltage which may be the same as or different from the reference voltage applied to the other input of the comparator 38. A signal is produced in the output of the comparator 39 when the output signal of the mass flow measuring device 10 is greater than the reference voltage applied to the other input of the comparator 39 and such an output signal is used to effect closure of the switch 26a which may also be in the form of a semi-conductor switching element such as a field effect transistor or which may be relay operated.

Thus, when the output of the mass flow measuring device is fairly low the output signal from the monitor 26 will effect adjustment of the zero drift of the mass flow measuring device 10 and this provision is made since the air/fuel ratio of the engine is greatly affected by zero drift in the mass flow measuring device 10 at low outputs of the latter. When the output from the mass flow measuring device 10 achieves a higher value then the switch 26a will be closed such that the output signal produced by the monitor 26 will adjust the frequency of the clock pulse generator in a manner hereinbefore described.

It is to be appreciated that by correct choice of the reference voltages applied to the other inputs of the comparators 38 and 39 both switches 26a and 26b could be closed or both switches could be open for certain values of outputs from the mass flow measuring device 10.

We claim:

1. A fuel control system comprising means for producing an electrical output pulse, the length of which determines the quantity of fuel to be fed to the engine, in response to at least one engine parameter, means for monitoring the exhaust emission of the engine, means responsive to the monitoring means for deriving a signal representative of the nature of the exhaust emission, at least two independent means for adjusting the length of the electrical output in accordance with the derived signal, and means for selectively operating at least one of said two independent means, said means for producing an electrical output pulse, comprising, a transducer sensitive to said at least one engine parameter, a variable frequency oscillator the frequency of which is controlled by said transducer, a count-up counter for receiving pulses from said variable frequency oscillator, for a predetermined fraction of an engine cycle, so as to produce in said count-up a count state representative of said at least one engine parameter, a count-down counter connected to the count-up counter for the transfer of said count state at the end of said fraction of the engine cycle, and a variable frequency clock pulse generator for supplying pulses to said count-down counter to determine the length of said output pulse, said two independent means for adjusting said output pulse length comprising means for adjusting the clock pulse frequency and means for modifying the output of said transducer respectively.

2. A fuel control system as claimed in claim 1 in which said means for selectively operating at least one of said two independent means comprises switch means sensitive to the output of said transducer.

3. An internal combustion engine fuel control system comprising an air intake airflow measuring device including an ion producer and electrode means associated with said ion producer for producing an electrical signal dependent on the air flow in the air intake manifold, means responsive to said electrical signal for producing an electrical output pulse of a length determining the quantity of fuel fed to the engine, means for monitoring the exhaust emission of the engine, means responsive to the monitoring means for deriving a signal representative of the nature of the exhaust emission, and means for adjusting the length of the electrical output pulse in accordance with the derived signal, said means for producing an electrical output pulse comprising a counter, means for introducing into said counter a count state variable in accordance with said electrical signal dependent on said air flow, a variable frequency clock pulse generator for supplying pulses to said counter and means for terminating said output pulse when the count state of said counter achieves a predetermined value, said means for introducing a count state into said counter comprising a further counter, and a variable frequency oscillator the frequency of which is controlled by the output of said electrode means in accordance with said air flow, said oscillator feeding pulses to the further counter for a predetermined fraction of an engine cycle.

4. A fuel control system as claimed in claim 3 in which said means for adjusting the length of the output pulse in accordance with said derived signal comprises means for varying the frequency of said clock pulse generator.

5. A fuel control system as claimed in claim 3 in which said means for adjusting the length of the output pulse comprises means for modifying the output of said transducer.

6. An internal combustion engine fuel control system comprising an air intake airflow measuring device including an ion producer and electrode means associated with said ion producer for producing an electrical signal dependent on the air flow in the air intake manifold, means responsive to said electrical signal for producing an electrical output pulse of a length determining the quantity of fuel fed to the engine, means for monitoring the exhaust emission of the engine, means responsive to the monitoring means for deriving a signal representative of the nature of the exhaust emission, at least two independent means for adjusting the length of the electrical output pulse in accordance with the derived signal and means for selectively operating at least one of said two independent means in response to said electrical signal produced by the electrode means, said means for producing an electrical output pulse comprising, a variable frequency oscillator the frequency of which is controlled by the output of said electrode means in accordance with said air flow, a count-up counter for receiving pulses from said variable frequency oscillator for a predetermined fraction of an engine cycle, so as to produce in said count-up counter a count state representative of said air flow, a count-down counter connected to the count-up counter for the transfer of said count state at the end of said fraction of the engine cycle, and a variable frequency clock pulse generator for supplying pulses to said count-down counter to determine the length of said output pulse, said two independent means for adjusting said output pulse length comprising means for adjusting the clock pulse frequency and means for modifying the output of said transducer respectively.

* * * * *